March 11, 1930. D. J. CREMEN Re. 17,620

CAP

Original Filed Feb. 9, 1927

INVENTOR

Daniel J. Cremen.

BY Stoner & Pickard

ATTORNEYS

Reissued Mar. 11, 1930

Re. 17,620

UNITED STATES PATENT OFFICE

DANIEL J. CREMEN, OF BLACKWOOD, NEW JERSEY

CAP

Original No. 1,682,004, dated August 28, 1928, Serial No. 166,884, filed February 9, 1927. Application for reissue filed December 13, 1929. Serial No. 413,909.

My invention relates to caps and more particularly to that class commonly known as "cooks' caps" and has for its object to provide a cap of that character which is light, cool and comfortable and which, although resembling in appearance the usual starched fabric cook's cap, is made of such inexpensive material that it may be discarded after it has become soiled. A still further object is to provide means enabling the adjustment of the brim by the wearer to any desired width.

A feature of the invention consists in providing a cap with an upstanding continuously extending substantially circular brim, and a crown of loosely woven material permitting the free passage of air therethrough, said brim at its lower peripheral edge having a portion folded inwardly upon itself providing means loosely disposed with said brim for attaching the crown to the latter.

A further feature of the invention consists in providing a cap with an upstanding continuously extending substantially circular brim composed of a fabric facing and a fibrous lining, and a crown of loosely woven material permitting free passage of air therethrough, said brim at its lower peripheral edge having a portion folded upon itself and extending upwardly within the latter, the folded portion of said brim having a relatively flexible portion to which the crown is attached.

Other and more specific objects and features of the invention will hereinafter appear and be pointed out in the claims.

In the drawing illustrating a preferred embodiment of the invention

Figure 1:
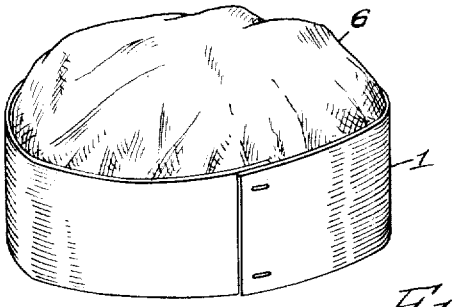
Figure 1 is a perspective view of the cap embodying the invention.
Figure 4:
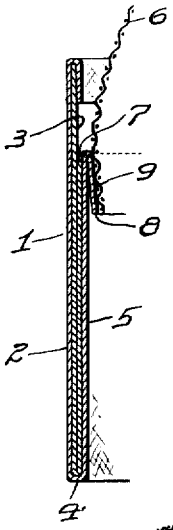
Figure 4 is a detail fragmentary vertical sectional view of the brim showing the means for attaching the crown to the latter.

In the drawing, the upstanding continuously extending brim 1 consists of an outer member 2 of relatively thin flexible fabric, such as muslin, and an inner member or lining of fibrous material 3, a porous paper preferably being employed. The thin fabric material is pasted to the fibrous lining in a manner such that the brim will present a starched-like appearance.

At its lower peripheral edge 4 the brim has a portion 5 folded inwardly and upwardly upon itself providing means disposed with said brim for attaching the crown 6 to the latter. The peripheral end 7 of the lining terminates short of the adjacent peripheral end 8 of the fabric, thus providing the brim with a relatively flexible tab portion 9 to which the crown 6 may be readily stitched. After the crown is attached, the portion 9 is folded so as to project downwardly within the cap.

Figure 2:
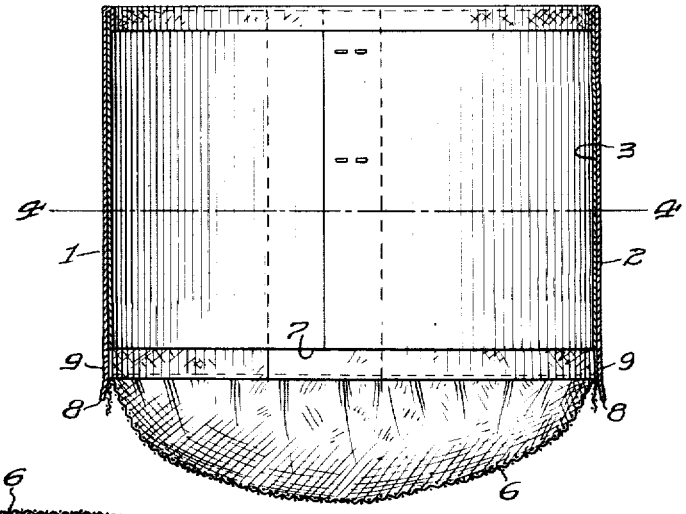
Figure 2 is a vertical sectional view of the cap showing the brim extended before being folded into normal position.
Figure 3:
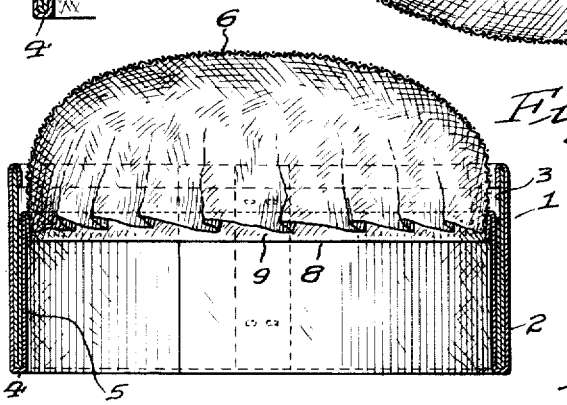
Figure 3 is a vertical sectional view of the cap.

To suit the taste of each individual wearer the width of the brim may be varied to a considerable extent by merely folding the brim at the desired point, and it is for this reason that the lining 3 extends a relatively great distance beyond the point 4—4, Figure 2, at which the brim is usually folded.

Since these caps are worn in places where the temperature is high, the crown 6 is made of a loosely woven fabric, such as lawn, adapted to permit the free passage of air therethrough for ventilating the head of the wearer.

By folding and refolding it in the manner disclosed, the brim is provided with a portion loosely disposed within the confines of the latter to which the crown is secured, thus producing a cap of neat appearance.

Having thus described my invention, I claim and desire to protect by Letters Patent of the United States:

1. A cap provided with an upstanding continuously extending substantially circular brim comprising a relatively flexible fabric facing and a relatively stiff fibrous lining intimately united by an adhesive, and a ventilating crown of loosely woven material, one of the peripheral ends of said lining terminating short of the adjacent peripheral end of the flexible fabric, the unlined portion of the said flexible material being loosely disposed within the brim and constituting tion loosely disposed within itself constitut- the sole means to which the crown is secured for connecting the latter to the brim.

2. A cap having an upstanding continuously extending brim comprising a relatively flexible fabric facing and a relatively stiff fibrous lining intimately united by an adhesive substance, and a ventilating crown of loosely woven fabric, said brim having a portion loosely disposed within itself constituting the sole means to which the crown is secured for connecting the latter to the brim.

3. A cap provided with an upstanding continuously extending substantially circular brim comprising a relatively flexible fabric facing and a relatively stiff fibrous lining, and a ventilating crown of loosely woven material, said brim at its lower peripheral edge having a portion folded upon itself and loosely extending within the latter, the folded portion of said brim having a relatively flexible portion to which the crown is secured for connecting the latter to the brim.

4. A cap provided with an upstanding continuously extending substantially circular brim comprising a relatively flexible fabric facing and a relatively stiff paper lining, and a crown of loosely woven material permitting the free passage of air therethrough, said brim at its lower peripheral edge having a portion folded upon itself extending upwardly with the brim, said portion terminating in a flexible extension providing means for attaching the crown to the brim.

In witness whereof, I have hereunto set my hand this 12th day of December, 1929.

DANIEL J. CREMEN.

CERTIFICATE OF CORRECTION.

Reissue Patent No. 17,620. Granted March 11, 1930, to

DANIEL J. CREMEN.

It is hereby certified that error appears in the printed specification of the above numbered patent requiring correction as follows: Page 2, line 1, claim 1, strike out the syllables and words "tion loosely disposed within itself constitu-"; and that the said Letters Patent should be read with this correction therein that the same may conform to the record of the case in the Patent Office.

Signed and sealed this 8th day of April, A. D. 1930.

M. J. Moore,
Acting Commissioner of Patents.

(Seal)